United States Patent [19]

Christophliemk et al.

[11] 4,089,929
[45] May 16, 1978

[54] PROCESS FOR THE PRODUCTION OF LOW-IRON ZEOLITIC ALUMINOSILICATES

[75] Inventors: Peter Christophliemk; Karl-Heinz Worms; Gerald Schreiber, all of Dusseldorf, Germany

[73] Assignees: Henkel Kommanditgesellschaft auf Aktien, Dusseldorf-Holthausen; Deutsche Gold- und Silber-Scheideanstalt vormals Roessler, Frankfurt am Main, both of Germany

[21] Appl. No.: 819,666

[22] Filed: Jul. 28, 1977

[30] Foreign Application Priority Data

Aug. 6, 1976  Germany .............. 2635357

[51] Int. Cl.$^2$ ............................................ C01B 33/28
[52] U.S. Cl. ............................ 423/118; 252/455 Z; 423/329
[58] Field of Search ............ 423/118, 328–330; 252/455 Z

[56] References Cited

U.S. PATENT DOCUMENTS

| | | | |
|---|---|---|---|
| 3,101,251 | 8/1963 | Howell | 423/118 |
| 3,114,603 | 12/1963 | Howell | 423/118 |
| 3,306,922 | 2/1967 | Barrer et al. | 260/448 |
| 3,390,958 | 7/1967 | Howell | 423/118 |
| 3,515,682 | 6/1970 | Flank et al. | 252/455 Z |
| 3,758,539 | 9/1973 | Flank | 252/455 Z |
| 4,034,058 | 7/1977 | Jameson et al. | 423/118 |

*Primary Examiner*—Edward J. Meros
*Attorney, Agent, or Firm*—Hammond & Littell

[57] ABSTRACT

A process for the production of a low-iron zeolitic alkali metal aluminosilicate from iron-containing, optionally previously activated, mineral aluminosilicate raw materials comprising subjecting the iron-containing, optionally previously activated, mineral aluminosilicate raw material in a charge of suitable molar ratios of $$M_2O : Al_2O_3 : SiO_2 : H_2O$$

where M is an alkali metal, by addition to the charge of sufficient caustic alkalis and optionally alkali metal silicate to give the desired molar ratio, to a hydrothermal crystallization treatment in the presence of an excess of alkali metal hydroxide to give a highly alkaline solution and sufficient of a water-soluble trialkanolamine to reduce the iron content of the crystalline zeolitic aluminosilicate formed, and recovering a low-iron zeolitic alkali metal aluminosilicate.

16 Claims, No Drawings

PROCESS FOR THE PRODUCTION OF LOW-IRON ZEOLITIC ALUMINOSILICATES

BACKGROUND OF THE INVENTION

Zeolitic aluminosilicates are characterized by the general empirical formula (oxide formula):

$$x \text{ Cat}_{2/n}\text{O} \cdot \text{Al}_2\text{O}_3 \cdot y \text{ SiO}_2 \cdot z \text{ H}_2\text{O}$$

In this oxide formula, Cat denotes a cation of the valence $n$, which is exchangeable with other cations, $x$ denotes a number from 0.2 to 1.5, preferably approximately 1, $y$ is a number larger than 1.5. The water content ($z$) depends on the degree of dryness. The above formula includes a plurality of substances which differ frequently only slightly in their chemical composition, but quite considerably in their structure and properties. In addition to the chemical composition, the X-ray diffraction diagram is generally used in crystalline types for identification.

Synthetic zeolites are of great technical importance and are used as cation-exchangers, particularly for softening water, as catalysts in chemical processes, as drying agents, separating agents, and sorption agents for solvents and gases, and as heterogeneous inorganic builders in washing and cleaning agents. Depending on their use, different types, degrees of dryness and purity are required.

Of particular technical importance are the two molecular sieve types A and X, which are also called by different names in the literature. Molecular sieve type A has the summation formula:

$$1.0 \pm 0.2 \text{ Cat}_{2/n}\text{O} \cdot 1.0 \text{ Al}_2\text{O}_3 \cdot 2.0 \pm 0.5 \text{ SiO}_2 \cdot 0 \text{ to } 6 \text{ H}_2\text{O}$$

and molecular sieve type X has the silicate enriched summation formula:

$$0.9 \pm 0.2 \text{ Cat}_{2/n}\text{O} \cdot 1.0 \text{ Al}_2\text{O}_3 \cdot 2.5 \pm 0.5 \text{ SiO}_2 \cdot 0 \text{ to } 8 \text{ H}_2\text{O}.$$

It is customary to prepare the molecular sieves first in their sodium form and to transform them then into other forms by cation-exchange (corresponding to the designations NaA and NaX, respectively, for the sodium forms). The X-ray diffraction diagram of molecular sieve NaA and the X-ray diffraction diagram of molecular sieve NaX are given in U.S. Pat. Nos. 2,882,243 and 2,882,244.

Another zeolitic aluminosilicate of increasing technical importance is the cubic molecular sieve P with a high silicate content, which is also called among others "Zeolite Pc" or "Molecular sieve B". The X-ray diffraction diagram is given, for example, in D. W. Breck, "Zeolite Molecular Sieves", New York, 1975, p. 365, and U.S. Pat. No. 3,008,803.

Two principally different synthetic methods are employed in the preparation of molecular sieves. The first method consists in crystallizing alkali metal aluminosilicate gels, which are formed by mixing preferably completely dissolved alkali metal aluminate and alkali metal silicate solutions with an excess of alkali in the batch. This way it is possible to obtain cation-exchanging products which contain less than 100 ppm impurities. However, this method has the disadvantage that it is relatively elaborate, particularly if we consider that the technical products used as the aluminate component and the silicate component must first be prepared.

The second synthetic method for the preparation of zeolitic aluminosilicates consists in crystallizing mineral aluminosilicate components which have been activated, if necessary, from a highly alkaline solution.

By using mineral aluminosilicates which are found abundantly in the earth's crust, the preparation of the zeolitic aluminosilicates can be considerably simplified and reduced in cost. Such mineral aluminosilicates which can be used are clays (such as attpulgite, bauxite, diaspore clay), vulcanic vitreous lavas (such as obsidian, perlite, pitchstone, pumice), other non-magmatic, non-kaolinic stones (such as andalusite, albite, cyanite, nepheline). These methods are described in DAS No. 1,191,346. Particularly suitable are minerals of the kaolinite group (kaolinite, nacrite, dickite, and halloysite), hereafter called "kaolin".

These minerals, preferably kaolin and pumice, can be converted to synthetic zeolites of varying purity, mostly after activation, with suitable molar ratios:

$$\text{Na}_2\text{O} : \text{Al}_2\text{O}_3 : \text{SiO}_2 : \text{H}_2\text{O}$$

adjusted in the charge, by hydrothermal treatment in a highly alkaline solution.

Customary kaolins consisting primarily of alumina minerals of the general chemical composition:

$$\text{Al}_2\text{O}_3 \cdot 2 \text{ SiO}_2 \cdot 2 \text{ H}_2\text{O}$$

can be converted practically completely (after activation) by a brief hydrothermal treatment with aqueous sodium hydroxide at temperatures above room temperature, preferably above 70° C, depending on the impurities, to the cation-exchanging aluminosilicate type NaA.

In the conversion of kaolin to molecular sieves with a high silicate content, such as NaX or Pc, it is necessary to "resilicate" the charge by adding additional, preferably soluble reactive silicate components, such as waterglass solution, crushed glass, sodium metasilicate, precipitation silica, and the like, corresponding to the desired molar ratios in the charge.

The activation can be effected by first calcining kaolin at 550° to 900° C, whereby it is converted to an anhydrous, destructured and therefore X-ray amorphous metakaolin, $\text{Al}_2\text{O}_3 \cdot 2 \text{ SiO}_2$. In modifications of this process, the thermal activation is effected in the presence of alkali and, optionally, silicate at temperatures of 250° to 500° C. Kaolin can also be activated, however, by thorough grinding or by acid treatment.

Aluminosilicate zeolites type P of the composition:

$$1 \pm 0.2 \text{ Na}_2\text{O} : 1 \text{ Al}_2\text{O}_3 : 4.0 \pm 1.3 \text{ SiO}_2 : y \text{ H}_2\text{O} \ (y = 2 \text{ to } 7)$$

preferably:

$$1 \pm 0.1 \text{ Na}_2\text{O} : 1 \text{ Al}_2\text{O}_3 : 3.6 \pm 0.8 \text{ SiO}_2 : y \text{ H}_2\text{O} \ (y = 2 \text{ to } 7)$$

can be obtained from kaolin, by preparing a mixture of destructured kaolin, sodium hydroxide and silicon dioxide, or a compound which is capable of supplying silicon dioxide under the above-indicated conditions, and water, where the portions of the reaction partners are so selected that the composition of the reaction mixture in the charge is in the range of the molar ratios:

3 to 10 Na$_2$O : 1 Al$_2$O$_3$ : 3 to 10 SiO$_2$ : 100 to 500 H$_2$O, with the proviso that the molar ratio:

SiO$_2$ : Na$_2$O is equal to or greater than 1, and that the subsequent crystallization is carried out preferably under stirring at temperatures above 95° C within 24 hours.

The volcanic glasses, on the other hand, are X-ray amorphous from the beginning. A further destructurization is, therefore, not necessary in most cases.

The high temperature treatment in the presence of caustic alkalis (and other components, if necessary) at temperatures preferably below 500° C is a well-known method of additional activation. Since these vitreous lavas usually have a high silicate excess (molar ratio SiO$_2$/Al$_2$O mostly over 6, in some cases even over 10), the charge must be enriched with aluminate components to obtain the molecular sieves type A and X with the lower silicate content. Pumice is a particularly prevalent volcanic earth. In addition to the principal components Al$_2$O$_3$ and SiO$_2$ it already contains considerable amounts of alkali metal oxides (up to 10%).

The kaolinic and volcanic aluminosilicates preferably used for conversion into zeolitic molecular sieves always have a considerable content of impurities, such as CaO, MgO, TiO$_2$, Fe$_2$O$_3$, and similar metal oxides, which is particularly high in pumice.

Of these impurities, iron oxide has a particularly negative effect in the subsequent use of the resulting molecular sieves, e.g., in the use of the products as catalysts in chemical processes. Iron-containing molecular sieves have a destabilizing effect on percompounds which might be contained in a solid mixture or in a suspension, used particularly in textile treatments.

The methods described so far for reducing the iron content of mineral aluminosilicates were not very successful, despite relatively high costs. Thus it has been suggested to treat kaolin in acid solution with reducing agents and then with organic ion exchange resins. The ion exchange resins loaded with iron were removed from the suspension by screening. Such a preliminary acid treatment in cumbersome, particularly when the following conversion of the aluminosilicates to molecular sieves takes place in a highly alkaline solution.

OBJECTS OF THE INVENTION

A object of the present invention is the development of a process for the preparation of low-iron, zeolitic alkali metal aluminosilicates from iron-containing mineral raw materials in the conventional hydrothermal process by adding thereto a water-soluble trialkanolamine.

Another object of the present invention is the development of a process for the production of a low-iron zeolitic alkali metal aluminosilicate from iron-containing, optionally previously activated, mineral aluminosilicate raw materials comprising subjecting the iron-containing, optionally previously activated, mineral aluminosilicate raw material in a charge of suitable molar ratios of M$_2$O : Al$_2$O$_3$ : SiO$_2$ : H$_2$O where M is an alkali metal, by addition to the charge of sufficient caustic alkalis and optionally alkaline metal silicate to give the desired molar ratio, to a hydrothermal crystallization treatment in the presence of an excess of alkali metal hydroxide to give a highly alkaline solution and sufficient of a water-soluble trialkanolamine to reduce the iron content of the crystalline zeolitic aluminosilicate formed, and recovering a low-iron zeolitic alkali metal aluminosilicate.

These and other objects of the invention will become more apparent as the description thereof proceeds.

DESCRIPTION OF THE INVENTION

A method has now been found for considerably reducing the iron content of zeolitic aluminosilicates without loss of the molecular sieve properties in a "single pot" reaction during the hydrothermal treatment of the mineral aluminosilicates in a highly alkaline solution.

The new method for the preparation of low-iron zeolitic aluminosilicates from iron-containing, optionally activated, mineral aluminosilicate raw materials with suitable adjusted molar ratios:

Na$_2$O : Al$_2$O$_3$ : SiO$_2$ : H$_2$O in the charge by hydrothermal treatment in the presence of caustic alkalis and, optionally, alkali metal silicate is characterized in that the crystallization is effected in a highly alkaline solution with the addition of water-soluble trialkanolamines.

More particularly, the present invention relates to a process for the production of low-iron zeolitic alkali metal aluminosilicate from iron-containing, optionally previously activated, mineral aluminosilicate raw materials comprising subjecting the iron-containing optionally previously activated, mineral aluminosilicate raw material in a charge of suitable molar ratios of M$_2$O : Al$_2$O$_3$ : SiO$_2$ : H$_2$O where M is an alkali metal, by addition to the charge of sufficient caustic alkalis and optionally alkali metal silicate to give the desired molar ratio, to a hydrothermal crystallization treatment in the presence of an excess of alkali metal hydroxide to give a highly alkaline solution and sufficient of a water-soluble trialkanolamine to reduce the iron content of the crystalline zeolitic aluminosilicate formed, and recovering a low-iron zeolitic alkali metal aluminosilicate.

The trialkanolamine is added in an amount of 1% to 100% by weight, preferably about 3% to 50% by weight, based on the amount of mineral aluminosilicate charged. Suitable water-soluble trialkanolamines are particularly trialkanolamines having from 2 to 4 carbon atoms in each alkanol group, such as triethanolamine and triisopropanolamine.

When trialkanolamine is employed in the conventional process, it is not necessary to change the reaction conditions. The liquid, water-soluble trialkanolamine is added to the charge before or at the start of the crystallization. Reaction conditions which lead to a rapid conversion of the X-ray amorphous mineral aluminosilicates to crystalline zeolitic alkali metal aluminosilicates also permit optimum use of trialkanolamines, particularly a high alkali concentration in the charge and a crystallization temperature of preferably above 70° C.

In the hydrothermal treatment of the mineral aluminosilicates without additional resilicating, hence without the addition of additional, preferably soluble, silicate, at least 5% by weight of alkali metal hydroxide based on the water content in the charge are necessary for the trialkanolamines to display their full activity. Preferably the hydrothermal treatment is effected in the presence of triethanolamine with at least 10% aqueous solution of sodium hydroxide.

In resilicating the charge, for example, in order to obtain the silicate-rich aluminosilicate types NaX or P, additional caustic alkali (or alkali metal hydroxide) is required in the charge to dissolve the additionally introduced silicate. For optimum release of the activity of the trialkanolamine, the additional amount of caustic alkali in the charge should be at least 25% by weight, based on the additional $SiO_2$. If technical waterglass solutions are used, the necessary amount of additional alkali is already contained in the waterglass solution. The waterglass solution contains as a rule even more than the necessary amount of alkali.

Ordinarily, the alkali solution or caustic alkali is an aqueous alkali metal hydroxide. Preferably caustic soda or aqueous sodium hydroxide is employed. However, corresponding lithium or potassium hydroxide solutions can be employed in the production of the zeolitic alkali metal aluminosilicates.

Trialkanolamine can also be used when employing autoclave charges with temperatures above 100° C. Despite the partly to considerable reduction of the required reaction time, autoclave charges are generally not preferred in the preparation of zeolitic molecular sieves because of their higher costs.

If a kaolin with about 0.7% $Fe_2O_3$ initial iron content is used in the practice of the invention, the residual iron content can be reduced to about 0.1%. This reduction is of an important technical application and manifests itself in an increase of the degree of whiteness and in a reduction of the destabilizing effect, for example, in the persence of percompounds. If mineral aluminosilicates are employed with 1% to 2% $Fe_2O_3$, the residual iron content can be reduced to 0.2% $Fe_2O_3$ if trialkanolamine is added. If a commercial type pumice is employed as a mineral aluminosilicate (with an initial iron content of about 2% $Fe_2O_3$), the influence of trialkanolamine is particularly convincing. While without trialkanolamine, brown products with at least 2% $Fe_2O_3$ are obtained, the aluminosilicates are pure white after treatment with trialkanolamine according to the invention. However, since the residual iron content cannot be reduced arbitrarily, low-iron starting material with from 0.2% to 0.9%, preferably less than 0.6%, $Fe_2O_3$ must be used to obtain low-iron products with much less than 0.1% $Fe_2O_3$.

For an economical procedure in the hydrothermal conversion of mineral aluminosilicates to molecular sieves it is advisable to reuse the mother liquors completely or at least partly, and to regenerate them if necessary.

Reuse of the mother liquors is particularly desirable for economical and ecological reasons, especially when the charge has a high caustic alkali and/or soluble silicate and/or trialkanolamine content. When trialkanolamine is added in great excess, the filtrates can be used again after adjustment of the molar ratios and addition of the mineral aluminosilicate, even without further addition of trialkanolamine in some cases. How often the filtrate can be used again depends not only on the ratios in the charge, but also to a great extent on the impurities of the mineral aluminosilicate used.

The iron content of the filtrates can be reduced by using organic ion-exchangers in a heterogeneous phase with reduced alkalinity.

The following examples are illustrative of the practice of the invention without being limitative in any respect.

EXAMPLE 1

The four kaolins, Bolus alba, CHINA CLAY M 501, Clay T 80, as well as Satintone, which vary quite considerably in their composition (particularly in their initial iron content, see Tables 1 and 2), were converted to molecular sieves of the NaA type by hydrothermal treatment with aqueous sodium hydroxide, first without the addition of trialkanolamine, according to the prior art, for comparison.

Bolus alba and Clay T 80 were first activated by heating for one hour to 700° C in a furnace. CHINA CLAY M 501 and Satintone were already commercially calcined as sold. The X-ray examination of the metakaolines showed that they were X-ray amorphous (for chemical composition and iron content, see Table 1).

Individual suspensions of 100 gm of metakaolin and 500 gm of a 20% aqueous sodium hydroxide solution were stirred in a one-liter, three-necked flask equipped with a stirrer and a reflux condenser for one hour at 80° C. Then the solid substance was filtered off, washed alkali-free with deionized water (pH-value of the wash water about 9), and dried for several hours at about 100° C in a vacuum drying cabinet. The products could be identified radiographically as highly crystalline molecular sieves of the NaA type without other crystalline components. The color of the products is only slightly less intensive than that of the metakaolins used. The residual iron content of the molecular sieves is given in Table 2.

EXAMPLE 2

The hydrothermal conversion of the same kaolins was repeated under otherwise identical charging and reaction conditions, but with the addition of 5 gm of triethanolamine to the suspension. The products had a clearly reduced iron content (see Table 2) and increased whiteness with the same properties and the same composition as those of Example 1.

EXAMPLE 3

The process of Example 2 was followed using calcined Clay T 80 as the metakaolin and 15 gm of triisopropanolamine. The resulting molecular sieve of the NaA type had a reduced residual iron content of only 0.2% $Fe_2O_3$ compared to the same molecular sieve of Example 1 prepared without the trialkanolamine and having a residual iron content as $Fe_2O_3$ of 1.05% (see Table 2).

EXAMPLE 4

The hydrothermal treatment of *Bolus alba* (calcined) corresponding to Example 1 was carried out with the addition of 25 gm of sodium gluconate. Compared to the blank test sample, the product had only a slightly reduced residual iron content of 0.42% $Fe_2O_3$ (see Table 2). Sodium gluconate is known to be an efficient scavenger for iron salts.

TABLE 1

Chemical Composition of the Mineral Aluminosilicates Used in the Examples (Kaolins and Powdered Pumice), Based on the Calcined or Anhydrous Substance

| Designation | $SiO_2$ | $Al_2O_3$ | $Na_2O$ | $K_2O$ | $TiO_2$ | CaO | MgO | $Fe_2O_3$ |
|---|---|---|---|---|---|---|---|---|
| CHINA CLAY M 501 | 54.0 | 43.0 | 0.1 | 1.2 | 0.1 | 0.1 | 0.1 | 0.66 |
| Bolus alba | 53.2 | 44.0 | 0.1 | 1.2 | 0.1 | 0.2 | 0.2 | 0.81 |
| Clay T 80 | 51.0 | 45.7 | — | — | 1.5 | — | — | 1.51 |
| Satintone | 52.0 | 44.5 | 0.3 | 0.3 | 1.7 | 0.2 | — | 0.49 |
| Powdered pumice | 73.3 | 13.0 | 4.5 | 5.0 | — | — | — | 1.95 |

TABLE 2

Varying Residual Iron Content in the Highly Crystalline Molecule Sieve of the NaA type, Which Were Prepared Under Charging Conditions of One Part Metakaolin and Five Parts of a 20% Aqueous Sodium Hydroxide Solution With or Without Addition of Complexing Agents From Different Kaolins (Examples 1 to 4)

| Example No. | Metakaolin (Calcined) | Addition of Complexing Agent (Complexing Agent in % by Weight Based on the Metakaolin) | Residual iron Content (a) in the Product |
|---|---|---|---|
| 1 | Bolus alba | No addition | 0.58 |
|  | M 501 |  | 0.60 |
|  | Clay T 80 |  | 1.05 |
|  | Satintone |  | 0.37 |
| 2 | Bolus alba | 5% Triethanolamine | 0.20 |
|  | M 501 |  | 0.11 |
|  | Clay T 80 |  | 0.20 |
|  | Satintone |  | 0.08 |
| 3 | Clay T 80 | 15% Triisopropanolamine | 0.20 |
| 4 | Bolus alba | 25% Sodium gluconate | 0.42 |

(a) As % $Fe_2O_3$ based on the anhydrous cation-exchanging product (NaA).

EXAMPLES 5 TO 7

In order to obtain highly crystalline molecular sieves of the NaX type, CHINA CLAY M 501 was stirred under the indicated conditions (see Table 3) with NaOH (pulverized), waterglass and water, heated to about 70° C, filled into glass bottles, and covered with foil. The bottles were placed in a heating cabinet and left there for 24 hours at 90° C. Then the solid substance was filtered off, washed substantially alkali-free (pH 9) and dried for several hours in the vacuum drying cabinet (40 Torr at 100° C).

The tests with triethanolamine were carried out in a corresponding manner. The residual iron content of the product as a function of the charge and the triethanolamine content is given in Table 3. All products show a highly crystalline molecular sieve of the NaX type in the X-ray diffraction diagram.

EXAMPLE 8

50 gm of finely ground pumice were mixed with 500 gm of a 10% aqueous sodium hydroxide solution and stirred for six hours under reflux. Then the solid substance was worked up as in the preceding examples. The product could be identified as a cation-exchanging, highly crystalline cubic molecular sieve of the P type with a yellow-brown color, due to its very high iron content of 3.2% $Fe_2O_3$. This marked increase of the residual iron content in the sodium aluminosilicate, compared to pumice (see Table 1), is due to the dissolution of silicate (great excess in the mineral aluminosilicate) in the sodium hydroxide solution. If the example is repeated with the addition of 25 gm of triethanolamine, a pure white sodium aluminosilicate is obtained with practically unchanged molecular sieve properties and a residual content of only 0.31% $Fe_2O_3$ (based on the anhydrous product). With an addition of 50 gm of triethanolamine, the residual iron content was only 0.23% $Fe_2O_3$.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the production of a low-iron zeolitic alkali metal aluminosilicate from iron-containing, optionally previously activated, mineral aluminosilicate raw materials comprising subjecting the iron-containing, optionally previously activated, mineral aluminosilicate raw material in a charge of suitable molar ratios of $$M_2O : Al_2O_3 : SiO_2 : H_2O$$

where M is an alkali metal, by addition to the charge of sufficient caustic alkalis and optionally alkali metal sili-

TABLE 3

Varying Residual Iron Content of the Highly Crystalline Molecular Sieve of the NaX type, which was Prepared with Varying Molar Ratios in the Charge from CHINA CLAY M 501 With and Without the Addition of Triethanolamine (Examples 5 to 7)

| | Molar Ratio | | | | Substances Used, Amount of Charge in gm | | | | | Residual Iron |
|---|---|---|---|---|---|---|---|---|---|---|
| Example | $Na_2O$ : | $Al_2O_3$ : | $SiO_2$ : | $H_2O$ | M 501 | NaOH | Water glass (a) | $H_2O$ | Triethanolamine | Content in Product (b) |
| 5 | 5 | 1 | 3 | 300 | 25 | 43.9 | 25.1 | 582 | — | 0.61 |
|  |  |  |  |  |  |  |  |  | 5 | 0.22 |
|  |  |  |  |  |  |  |  |  | 10 | 0.19 |
| 6 | 5 | 1 | 5 | 300 | 25 | 37.7 | 75.3 | 551 | — | 0.65 |
|  |  |  |  |  |  |  |  |  | 5 | 0.22 |
|  |  |  |  |  |  |  |  |  | 10 | 0.22 |
| 7 | 7.5 | 1 | 5 | 300 | 25 | 60.4 | 75.3 | 545 | — | 0.62 |
|  |  |  |  |  |  |  |  |  | 5 | 0.20 |
|  |  |  |  |  |  |  |  |  | 10 | 0.21 |

(a) Waterglass solution with 8% by weight $Na_2O$ and 26.9% by weight $SiO_2$.
(b) As $Fe_2O_3$, based on the anhydrous cation-exchanging product (NaX).

cate to give the desired molar ratio, to a hydrothermal crystallization treatment in the presence of an excess of alkali metal hydroxide to give a highly alkaline solution and sufficient of a water-soluble trialkanolamine to reduce the iron content of the crystalline zeolitic aluminosilicate formed, and recovering a low-iron zeolitic alkali metal aluminosilicate.

2. The process of claim 1 wherein said water-soluble trialkanolamine is employed in an amount of from 1% to 100% by weight, based on the mineral aluminosilicate raw material employed.

3. The process of claim 1 wherein said water-soluble trialkanolamine is employed in an amount of from 3% to 50% by weight, based on the mineral aluminosilicate raw material employed.

4. The process of claim 1 wherein said water-soluble trialkanolamine has from 2 to 4 carbon atoms in the alkanol group.

5. The process of claim 4 wherein said trialkanolamine is triethanolamine.

6. The process of claim 4 wherein said trialkanolamine is triisopropanolamine.

7. The process of claim 1 wherein said hydrothermal treatment is conducted at temperatures above 70° C.

8. The process of claim 1 wherein said excess of alkali metal hydroxide is at least 5% based on the water content of the charge.

9. The process of claim 1 wherein said excess of alkali metal hydroxide is at least 10% based on the water content of the charge.

10. The process of claim 1 wherein said mineral aluminosilicate raw materials are highly destructured metakaolins.

11. The process of claim 1 wherein said mineral aluminosilicate raw materials have an initial iron content of from about 0.2% to 0.9% on an anhydrous basis, calculated as $Fe_2O_3$.

12. The process of claim 1 wherein said mineral aluminosilicate raw materials have an initial iron content of from less than 0.6% on an anhydrous basis, calculated as $Fe_2O_3$.

13. The process of claim 1 wherein the mother liquor from the recovery step is recycled to the next charge.

14. The process of claim 1 wherein said low-iron zeolitic alkali metal aluminosilicate recovered is a sodium aluminosilicate of the NaA type.

15. The process of claim 1 wherein said low-iron zeolitic alkali metal aluminosilicate recovered is a sodium aluminosilicate of the NaX type.

16. The process of claim 1 wherein said low-iron zeolitic alkali metal aluminosilicate recovered is a sodium aluminosilicate of the cubic P type.

* * * * *